(12) United States Patent
Miller et al.

(10) Patent No.: US 6,270,150 B1
(45) Date of Patent: Aug. 7, 2001

(54) TRAILER WITH CONDUIT RETAINER

(75) Inventors: Timothy Dean Miller, Rincon; Charles Robert Fetz, Savannah, both of GA (US)

(73) Assignee: Great Dane Limited Partnership, Chicago, IL (US)

( * ) Notice: Subject to any disclaimer, the term of this patent is extended or adjusted under 35 U.S.C. 154(b) by 0 days.

(21) Appl. No.: 09/211,621

(22) Filed: Dec. 15, 1998

(51) Int. Cl.7 .................................................. B60R 27/00
(52) U.S. Cl. ............................................. 296/181; 296/208
(58) Field of Search ..................................... 296/181, 208

(56) References Cited

U.S. PATENT DOCUMENTS

| | | |
|---|---|---|
| 3,243,201 | 3/1966 | Bock . |
| 3,251,069 | 5/1966 | Clark . |
| 4,148,113 * | 4/1979 | Dvorachek ................................ 24/16 |
| 4,518,196 | 5/1985 | Forster et al. . |
| 4,614,838 | 9/1986 | Sandstrom . |
| 4,703,948 | 11/1987 | Ehrlich . |
| 4,711,060 | 12/1987 | Scherrer . |
| 5,890,757 * | 4/1999 | Masterson et al. .................. 296/181 |

FOREIGN PATENT DOCUMENTS

1392940  *  5/1975  (GB) .

* cited by examiner

Primary Examiner—Joseph D. Pape
Assistant Examiner—Greg Blankenship
(74) Attorney, Agent, or Firm—Nelson Mullins Riley & Scarborough, LLP

(57) ABSTRACT

A trailer includes a deck assembly with parallel longitudinal sides, a plurality of wheels supporting the deck assembly, and a bracket insert releasably attached to the deck assembly. The bracket insert includes a retaining clip securing an elongated conduit.

24 Claims, 5 Drawing Sheets

TRAILER WITH CONDUIT RETAINER

BACKGROUND OF THE INVENTION

The present invention relates to trailers and more particularly to a trailer having a bracket insert that retains pneumatic, electrical, hydraulic or other conduits associated with the trailer.

Van-type trailers typically include a deck assembly supported by a sidewall structure, wheels and retractable front legs. The deck assembly often includes longitudinal floorboards and transverse cross-members, such as I-beams, extending between opposing bottom rails of the side walls. The deck transfers its load to the bottom rails, wheels and, depending on whether the trailer is coupled to a tractor or is free-standing, to tractor wheels or the front legs.

While flatbed trailers also often include a deck assembly with a floor and transverse cross members, they do not have a monocoque structure. Instead, the flatbed deck is typically supported by longitudinal beams supported by the wheels and retractable legs so that the load received by the deck is transferred to the wheels through the beams.

Trailers typically require conduits comprising or carrying electrical, pneumatic and/or other lines to various trailer systems. Accordingly, it has been known in the art to provide channeled cavities within the trailer's deck assembly to receive the various conduits and connectors. It has also been known to provide grommetted holes in I-beam cross members through which conduits are passed longitudinally along the trailer side. One specific example of a device that retains trailer conduits in a fixed position within a housing is provided by U.S. Pat. No. 4,703,948 to Ehrlich, incorporated herein by reference.

SUMMARY OF THE INVENTION

The present invention recognizes and addresses disadvantages of the prior art trailer constructions and methods.

Accordingly, it is an object of the present invention to provide an improved trailer having a conduit retainer.

This and other objects may be achieved by a trailer including a deck assembly with parallel longitudinal sides and a plurality of wheels supporting the floor. A bracket insert is releasably attached to the deck assembly and includes a retaining clip securing an elongated conduit. In one preferred embodiment, the deck includes a floor and a plurality of transverse I-beams. A plurality of bracket inserts rest on respective I-beams against a longitudinal side of the floor and are held in place by a Z-shaped member having one leg that extends between the floor and the I-beams and another leg that engages the bracket insert by a protrusion extending from the leg into a corresponding groove in each bracket insert.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
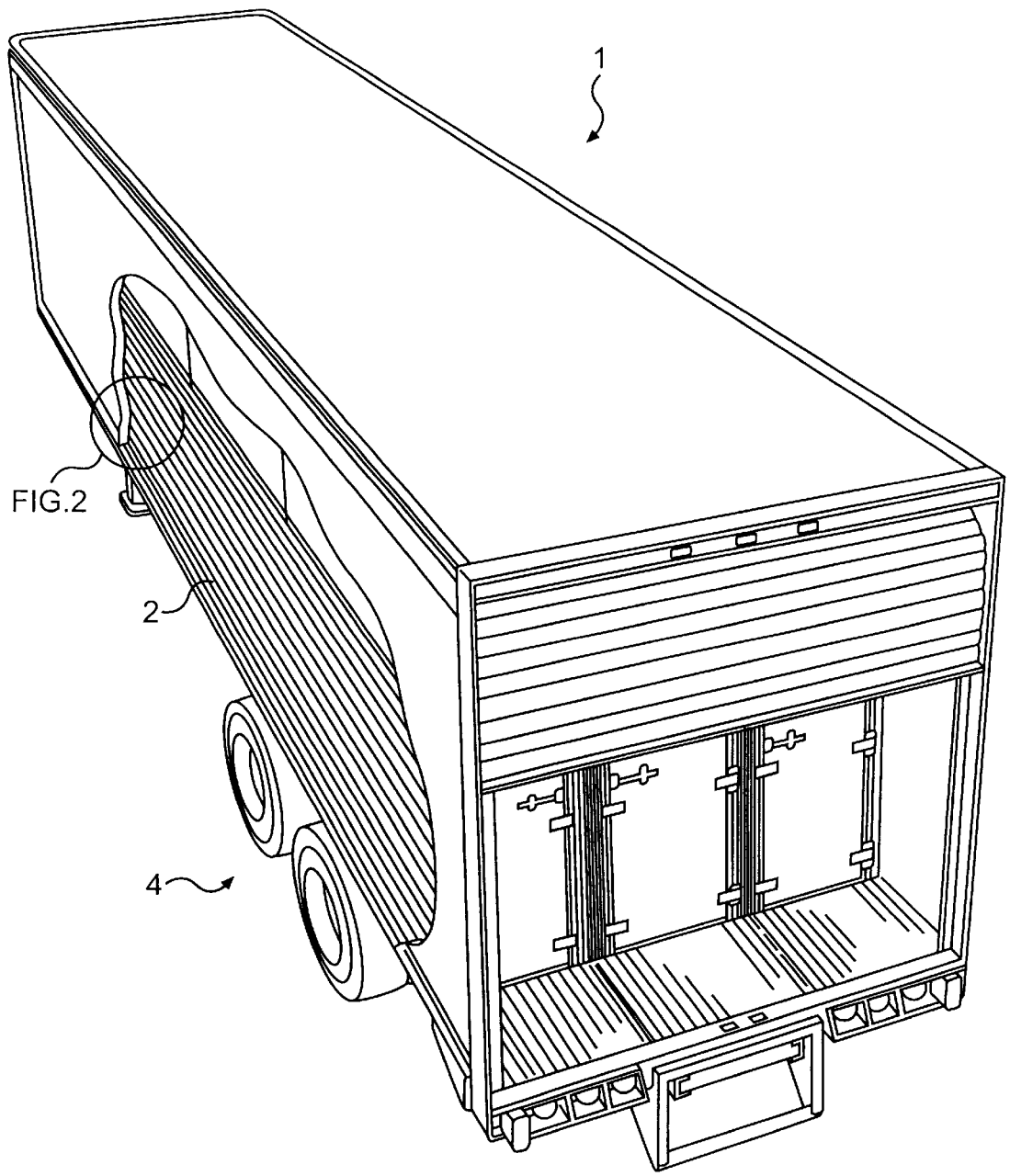
FIG. 1 is a partially broken away perspective view of a van type trailer in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the present invention, one or more examples of which are illustrated in the accompanying drawings. Each example is provided to explain the invention, not limit of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a trailer 1 according to the present invention is described having conduits including or comprising electrical cables, pneumatic tubing, or the like along one side of the trailer. Those skilled in the art should recognize; however, that the trailer in another preferred embodiment could have a similar structure and details of construction on both trailer sides. The unillustrated trailer side can therefore be a mirror image of the details and figures referenced below.

Figure 2:
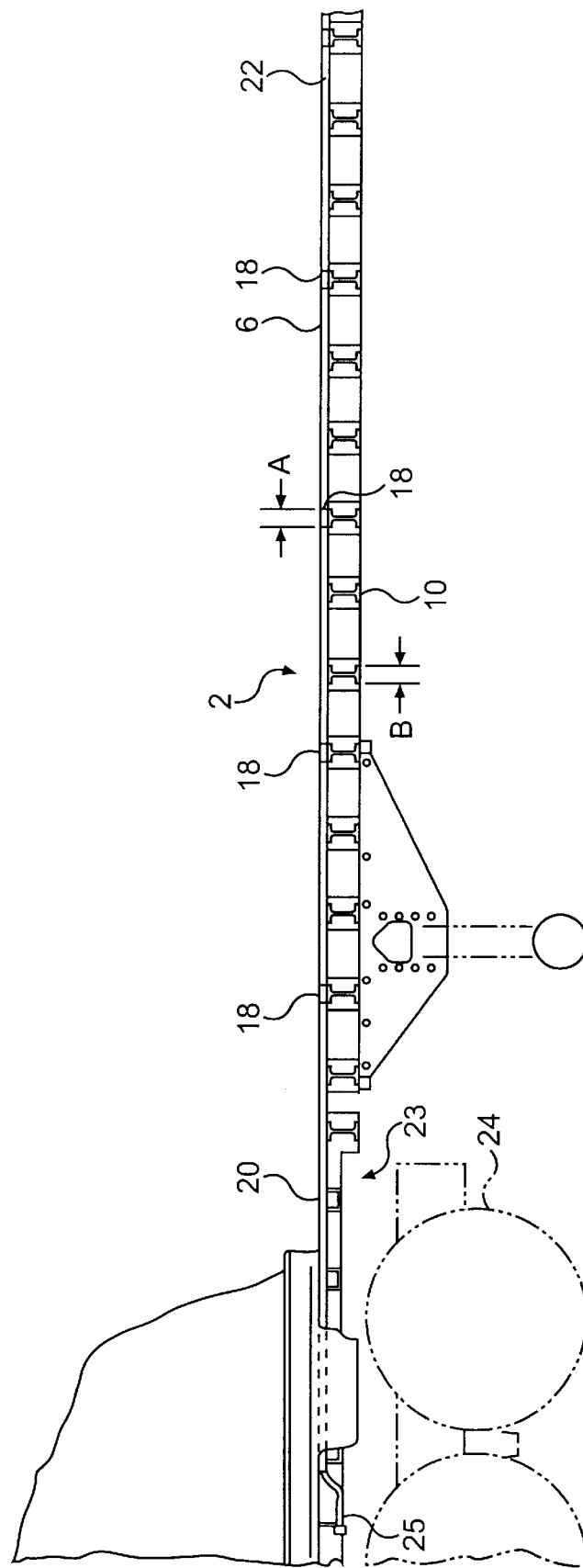
FIG. 2 is a partial side view of the trailer as in FIG. 1.
Figure 3A:
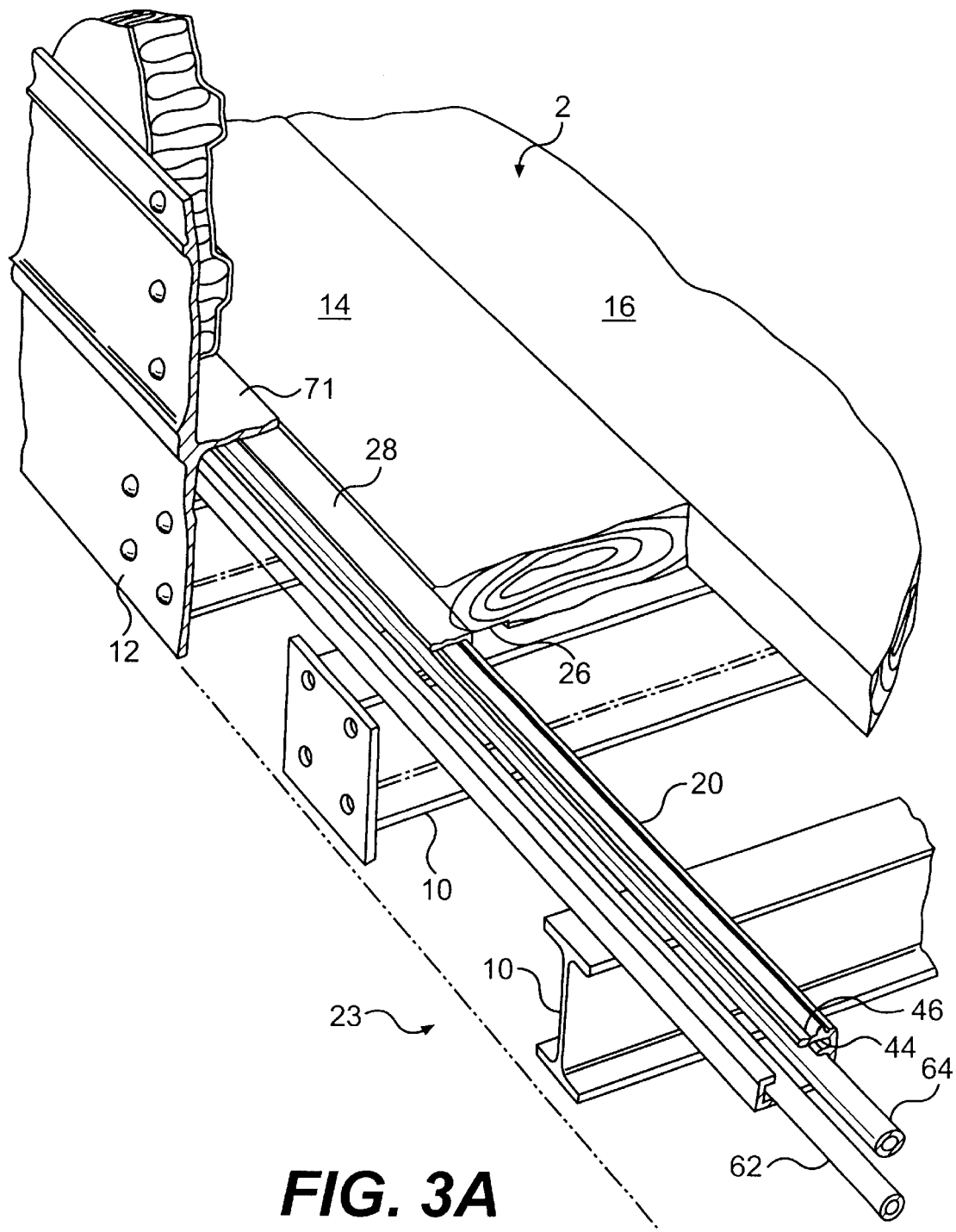
FIG. 3A is an enlarged perspective view of a portion of the trailer shown in FIG. 1.
Figure 3B:
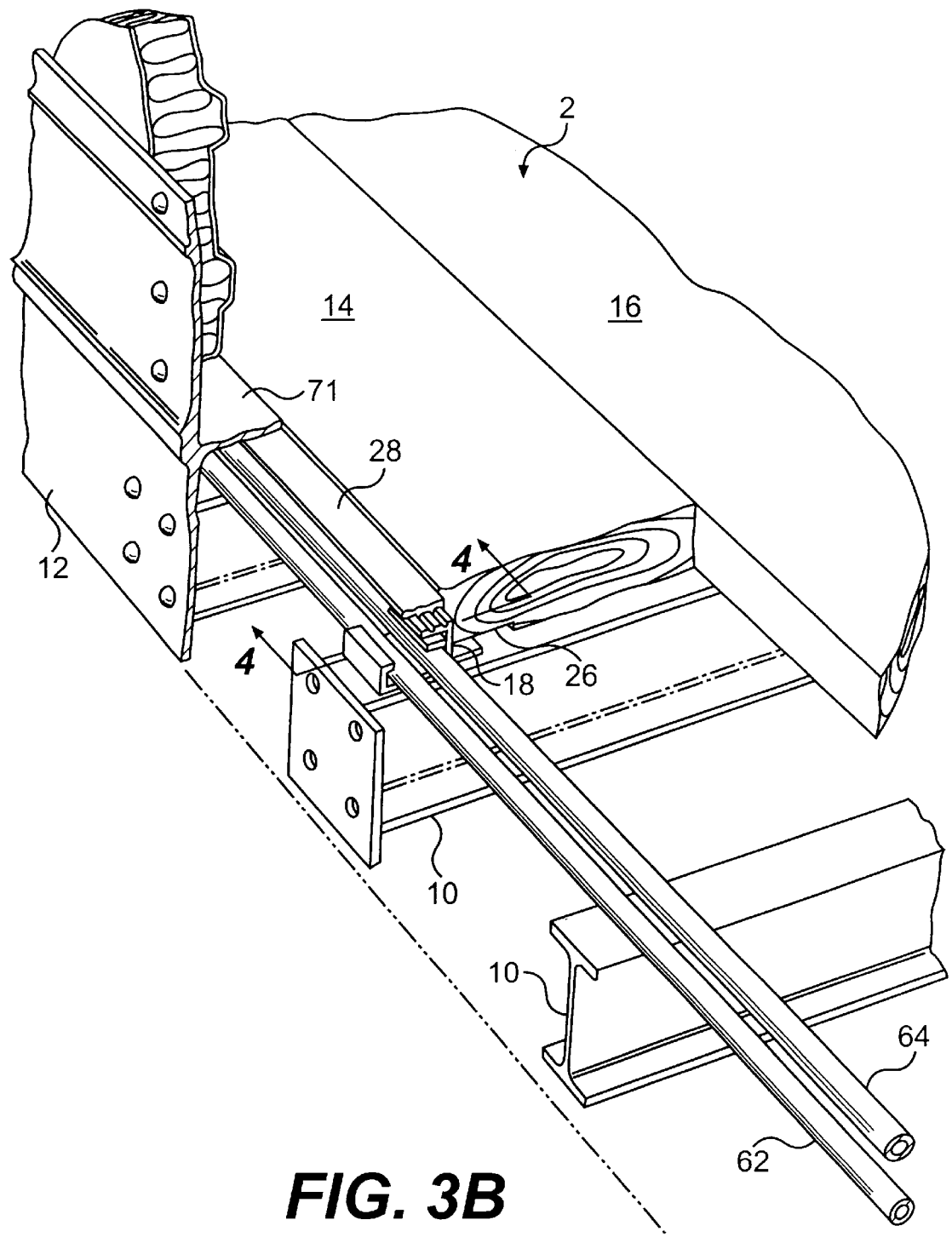
FIG. 3B is an enlarged perspective view of a portion of the trailer shown in FIG. 1.

FIG. 1 is a partially cut away perspective view of van-type trailer 1 showing a deck assembly 2 supported by wheels 4. As best seen in FIGS. 2, 3A and 3B, the deck assembly includes a floor 6 and I-beam support members, also referred to as I-beams, 10 that extend transverse to the longitudinal direction of the trailer and that are connected on both ends to trailer bottom rails 12 (one of which is shown in FIGS. 3A and 3B). The floor comprises a series of parallel longitudinal floorboards including an edge plank 14 and inner planks 16 extending side-by-side across the trailer and secured to I-beam support members 10 by bolts or other materials and methods as should be understood in the art.

Referring to FIG. 2, the trailer includes a plurality of bracket inserts, also referred to as inserts, 18 and 20 that secure conduits running along a longitudinal edge of the trailer parallel to a longitudinal flooring edge 22. The bracket inserts are spaced apart along the trailer side, and a given conduit may turn inwardly into the trailer between a given pair of successive inserts. It should be understood; however, that a trailer according to the present invention may be provided with any number of bracket inserts as is suitable and that the inserts may be any suitable length. Accordingly, in another preferred embodiment where a single bracket insert extends the entire length of the trailer or a substantial portion thereof, transverse holes may be provided in the insert to allow a conduit to turn to the trailer interior at a desired position.

Returning to the exemplary embodiment shown in FIG. 2, the shorter bracket inserts 18 have a length A (for example, approximately 2.5 inches) that is less than the width B of I-beams 10. The insert length in this embodiment may extend, however, slightly larger than the I-beam width. The longer insert 20 extends across several I-beams 10 and spans an area 23 under which tractor wheels 24 are disposed. That is, bracket insert 20 is long enough to enclose conduits that would otherwise be exposed over wheels that are beneath area 23 so that the bracket insert protects the conduits from debris that could reasonably be expected to be thrown up by the wheels during operation. Accordingly, bracket insert 20 receives the conduits from the point they exit a flexible loom 25 and extends rearward of the wheels. In addition, an elongated bracket insert extends entirely over wheels 4 (FIG. 1) across an area at the trailer's rear. The loom is made of one inch flexible ribbed plastic and extends from the forwardmost and rearwardmost bracket inserts to protect the conduits from chafing against the I-beams.

Bracket inserts 18 and 20 are spaced apart by a sufficient distance (for example every third or fourth I-beam for inserts 18) so that the conduits are securely attached to the trailer. It should be understood, however, that inserts may be placed more frequently, for example at every I-beam. Where it is desirable to continuously enclose the conduit along the entire trailer length, a single continuous bracket insert may be provided as described above in place of the spaced apart inserts.

Figure 4:
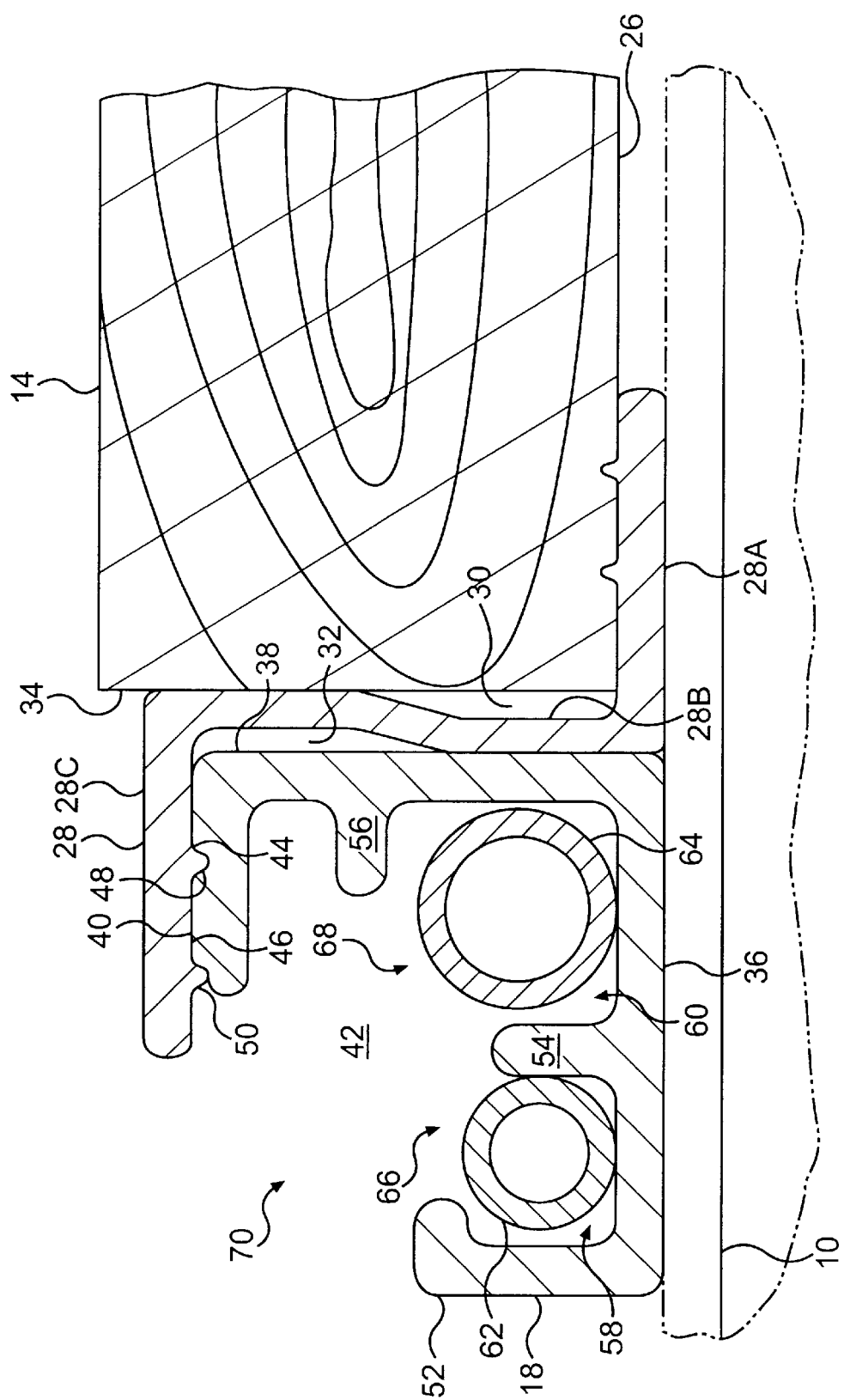
FIG. 4 is a sectional view taken along the line 4—4 of FIG. 3B.

Referring now to FIGS. 3A, 3B and 4, edge plank 14 defines a lower recessed notch 26 along the bottom, outer plank edge. Notch 26 engages a Z-shaped member, also referred to as member, 28 along a lower horizontal arm 28A and a vertical portion 28B thereof. Z-shaped member 28 is a unitary piece of extruded aluminum that runs the length of the trailer flooring system. It may be attached to the deck assembly by intermittent screws extending through the member into edge plank 14 or by any other suitable mechanism. For example, it may simply be held in place against the floor side by another trailer component such as the bottom rail or from pressure exerted by the floorboard. Arm 28A may include upwardly extending protrusions as shown in FIG. 4 that dig into edge plank 14 to hold member 28 in place. Member 28 may be attached to the floor and/or the I-beams.

Vertical portion 28B attaches at its end lower horizontal arm 28A to a second horizontal arm 28C. Arm 28C extends in a direction opposite from arm 28A. An angled bend in upright 28B defines opposing gaps 30 and 32 on opposite sides of the upright. The bend facilitates installation of member 28 so that arm 28A extends properly between edge plank 14 and I-beam 10 and so that the upper portion of upright 28B is flush against a longitudinal edge 34 of edge plank 14 and floor, without requiring that edge plank 14 have a beveled lower edge.

Referring particularly to FIG. 4, arm 28C, vertical portion 28B and the top surfaces of I-beam 10 define a generally U-shaped channel that opens to the side and receives bracket insert 18. Thus, while the insert is described herein as resting on the I-beam and against plank 14, it should be understood that this may occur through another trailer component such as member 28. Insert 18 includes an outer wall including a first horizontal section 36, a vertical section 38 and a second horizontal section 40. Horizontal sections 36 and 40 each defines an approximate right angle with opposite ends of vertical section 38 so that the outer wall defines an enclosure 42.

An upper edge of section 40 defines a pair of grooves 44 and 46 that receive complimentary protrusions 48 and 50 on the lower surface of Z-shaped member arm 28C. The interaction between the protrusions and grooves help maintain the position of insert 18.

Insert 18 further includes a plurality of interior members 52, 54 and 56 that form retaining clips 58 and 60 for conduits 62 and 64. Accordingly, each clip is comprised of a wall including one or more parts of the insert outer wall and the respective interior members so that the clip wall surrounds a hole extending parallel to longitudinal side 34. A respective conduit 62 or 64 passes through the hole generally parallel to the longitudinal side. The clips may be configured so that the holes are any suitable size or shape.

The conduits retained by the clips may comprise or enclose electrical, pneumatic or other lines needed to operate trailer systems such as lights and brakes. It should be understood that the conduits may sag and are therefore not perfectly straight. Further, depending on the position at which insert 18 is attached to the deck assembly, the conduits may be disposed slightly above or slightly below the planar area defined by the flooring planks. Nevertheless, it should be understood that the conduits extend generally parallel to the floor's longitudinal side.

The clip walls in the illustrated embodiment do not fully enclose the clip holes. Specifically, adjacent interior members that form clips 58 and 60 define respective gaps 66 and 68 between their distal ends. The width of each gap 66 and 68 is less than the cross-sectional outer diameter of conduits 62 and 64, respectively. As should be understood in the art, the conduits may be constructed of a resilient material such as nylon tubing and may therefore be pushed through the gaps into the clips. Insert 18 is constructed from a resilient material such as polyvinyl chloride (PVC), and the interior members may also give slightly as the conduits are pressed in. The conduits and interior members are sufficiently rigid, however, that the conduits remain in their respective clips during normal trailer use. In a preferred embodiment, each interior member, and the insert outer wall, is approximately 0.135 inches thick.

A gap 70 is formed between the distal ends of horizontal section 40 and interior member 52, which also forms a part of the insert's outer wall. Gap 70 has a width sufficient to allow passage of conduits 62 and 64 therethrough. Each of gaps 66, 68 and 70 opens generally upward. That is, even though each opening has a transverse component, none opens downward. It should be understood, however, that other configurations of the insert are possible and that an insert may be constructed so that clip gaps open entirely or partially to the side or downward.

Bracket insert 18 is preferably formed by a nonconducting, resilient material such as PVC or fiberglass and is releasably attached to the flooring by member 28. That is, it may be removed from its position shown in FIGS. 3B and 4 without destruction, damage or substantial disassembly of the trailer. In the illustrated embodiment, for example, the protrusions 50 and 48 and the respective grooves 46 and 44 provide a snap fit of the resilient insert 18 within the U-shaped channel defined by Z-shaped member 28 and I-beam 10. Thus, the insert may be snapped into place during trailer construction. To remove the insert, the bottom rail may be removed, and an operator may grip interior member 52 and pull outward. The resiliency of insert 18 thereby permits release of the insert from the U-shaped channel. As shown in FIG. 3B, there is a gap between bottom rail 12 and the insert, and the insert may be removed without removing the bottom rail by reaching from the underside of the trailer, gripping interior member 52, and pulling outward. Further, particularly where grooves 44 and 46 extend entirely across horizontal section 40, an operator may reach from the trailer's underside and push the insert laterally off of the I-beam, thereby allowing the insert's removal without removing the bottom rail.

FIG. 3A illustrates the longer bracket insert 20 extending over area 23. Bracket insert 20 is a longer version of bracket inserts 18 (FIG. 3B). It is constructed from the same material and has the same construction to secure conduits 62 and 64. It is also held in place by Z-shaped member 28 and may be similarly installed and removed. Because bracket insert 20 defines an upward opening, it shields the conduits from moisture, road hazards, chemicals, salt spray and other damaging agents which may be thrown up from the tires in the wheel area. As a result, the conduits may exhibit greater longevity and require less maintenance.

Moreover, the upward opening allows the bracket inserts to secure conduits of less than an ideal diameter. That is, even if the conduit diameters are less than the respective widths of gaps 66 and 68 (FIG. 4), the conduits may still be held in place.

In the illustrated embodiment, a flange 70 of bottom rail 12 engages the upper surface of arm 28C. The thickness of flange 70 generally corresponds to the height difference seen in FIG. 4 between the upper surface of horizontal arm 28C and the upper surface of edge plank 14, thereby providing a substantially smooth surface to the trailer flooring. It should be understood, however, that the thickness of flange 70 may not exactly equal the height difference.

While the above description is given in reference to a van type trailer, the usefulness of the present invention is not limited thereto. Other trailer designs, for example those having insulated or composite, largely unitary flooring, may be modified to incorporate the present bracket insert. Thus, the present invention may be used with the floor design described in U.S. Pat. No. 5,772,276, which is commonly owned by the assignee of the present application and is incorporated herein by reference.

Modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A trailer, said trailer comprising:
   a deck assembly with parallel longitudinal sides, a floor extending between said longitudinal sides and a plurality of spaced apart support members extending transversely across said trailer with respect to said floor;
   a plurality of wheels supporting said deck assembly; and
   at least one bracket insert attached to said deck assembly so that said at least one bracket insert is removable from said deck assembly without destruction of or damage to the trailer, wherein said at least one bracket insert includes at least one retaining clip securing an elongated conduit and wherein said at least one bracket insert defines a length less than a spacing between adjacent said support members.

2. The trailer as in claim 1, wherein said at least one bracket insert is a plurality of bracket inserts spaced apart and generally parallel to a said longitudinal side.

3. A trailer, said trailer comprising:
   a deck assembly with parallel longitudinal sides;
   a plurality of wheels supporting said deck assembly; and
   at least one bracket insert attached to said deck assembly so that said at least one bracket insert is removable from said deck assembly without destruction of or damage to the trailer, wherein said at least one bracket insert includes at least one retaining clip securing an elongated conduit,
   wherein said at least one bracket insert includes an outer wall constructed from a resilient material, said outer wall being received in a generally U-shaped channel defined by said deck assembly in a snap fit.

4. The trailer as in claim 3, wherein said resilient material includes polyvinyl chloride.

5. The trailer as in claim 3, wherein one of said outer wall and said channel includes a protrusion extending therefrom and wherein the other of said outer wall and said channel includes a groove receiving said protrusion, thereby retaining said at least one bracket insert in said U-shaped channel.

6. The trailer as in claim 1, wherein said at least one bracket insert rests on one of said support member and against said floor.

7. The trailer as in claim 3, including an elongated member extending along one of said longitudinal sides of said floor and attached to at least one of said floor and said support members, said elongated member defining at least part of said channel receiving said at least one bracket insert by a snap fit.

8. The trailer as in claim 7, wherein said elongated member is generally Z-shaped, said elongated member having a vertical member, a first horizontal member extending from said vertical member and disposed between said floor and said support member, and a second horizontal member extending from said vertical member away from said first horizontal member and engaging said at least one bracket insert.

9. The trailer as in claim 3, wherein said at least one retaining clip defines a hole extending therethrough parallel to a said longitudinal side and receiving said elongated conduit.

10. The trailer as in claim 9, wherein said hole is surrounded by a wall that includes a gap having a width sufficient to allow said elongated conduit to pass therethrough into said hole.

11. The trailer as in claim 10, wherein at least one of said wall and said elongated conduit is constructed from a resilient material and wherein said width of said gap is less than the cross-sectional width of said elongated conduit.

12. The trailer as in claim 1, including a plurality of said at least one retaining clips.

13. The trailer as in claim 10, wherein said at least one bracket insert includes an outer wall defining an outer wall gap having a width sufficient to allow said elongated conduit to pass therethrough.

14. The trailer as in claim 13, wherein said outer wall gap opens generally upward.

15. The trailer as in claim 13, wherein said outer wall gap opens transversely.

16. The trailer as in claim 2, wherein one of said bracket inserts extends parallel to said longitudinal side and spans an area of said trailer under which a wheel is disposed.

17. The trailer as in claim 2, wherein at least one of said bracket inserts is disposed on an upper side of one of said support members.

18. The trailer as in claim 17, wherein said at least one bracket insert is disposed on an upper side of only one of said support members and wherein the length of said at least one bracket insert with respect to said longitudinal side is at most approximately equal to the width of said only one support member with respect to said longitudinal side.

19. A trailer, said trailer comprising:
   a deck assembly with parallel longitudinal sides;

a plurality of wheels supporting said deck assembly; and a plurality of bracket inserts attached to said deck assembly, each of said bracket inserts includes an outer wall constructed from a resilient material, said outer wall being received in a generally U-shaped channel defined by said deck assembly in a snap fit, and a retaining clip defining a hole extending therethrough parallel to one of said parallel longitudinal sides and securing an elongated conduit, wherein a wall surrounding said hole includes a gap having a width sufficient to allow said elongated conduit to pass therethrough into said hole, and wherein at least one of said clip wall and said conduit is constructed from a resilient material and wherein said gap width is less than the cross-sectional width of said conduit.

20. The trailer as in claim 19, wherein said deck assembly includes a floor and a plurality of support members extending transversely across said trailer with respect to said floor and wherein at least one of said bracket inserts rests on an upper side of at least one of said support members and against said floor.

21. The trailer as in claim 20, wherein one of said bracket inserts extends parallel to said longitudinal side, has an enclosed bottom portion and spans an area of said trailer under which a wheel is disposed.

22. A trailer, said trailer comprising:

a deck assembly with parallel longitudinal sides;

a plurality of wheels supporting said deck assembly; and a bracket insert attached to said deck assembly, said bracket insert including an outer wall defining a gap opening generally upward and having a width sufficient to allow an elongated conduit to pass therethrough, and a retaining clip defining a hole extending therethrough parallel to one of said parallel longitudinal sides and securing said elongated conduit, wherein said clip defines a wall that surrounds said hole and includes a gap having a width sufficient to allow said elongated conduit to pass therethrough into said hole and wherein at least one of said clip wall and said elongated conduit is constructed from a resilient material and wherein said gap width is less than the cross-sectional width of said elongated conduit.

23. A trailer, said trailer comprising:

a deck assembly with parallel longitudinal sides;

a plurality of wheels supporting said deck assembly; and a plurality of bracket inserts attached to said deck assembly, each of said bracket inserts includes an outer wall constructed from a resilient material, said outer wall being received in a generally U-shaped channel defined by said deck assembly in a snap fit, and a retaining clip defining a hole extending therethrough parallel to one of said parallel longitudinal sides and securing an elongated conduit, wherein a wall surrounding said hole includes a gap having a width sufficient to allow said elongated conduit to pass therethrough into said hole, wherein at least one of said clip wall and said elongated conduit is constructed from a resilient material and wherein said gap width is less than the cross-sectional width of said elongated conduit.

24. The trailer as in claim 23, including an elongated member extending along said longitudinal side of said floor and attached to said deck assembly, said member defining at least part of said U-shaped channel, wherein one of said elongated member and said plurality of bracket inserts includes a protrusion extending therefrom and the other of said elongated member and said plurality of bracket inserts includes a groove receiving said protrusion, thereby retaining said plurality of bracket inserts in said U-shaped channel.

\* \* \* \* \*